(12) United States Patent
Zhang et al.

(10) Patent No.: US 12,491,740 B2
(45) Date of Patent: Dec. 9, 2025

(54) EXTERNAL TPMS SENSOR FOR HEAVY-DUTY TRUCKS

(71) Applicant: HAMATON AUTOMOTIVE TECHNOLOGY CO., LTD, Hangzhou (CN)

(72) Inventors: Jianer Zhang, Hangzhou (CN); Zenan Hu, Hangzhou (CN); Zengchao Ji, Hangzhou (CN); Mingguang Yu, Hangzhou (CN); Chuan Zhang, Hangzhou (CN); Zheng Tang, Hangzhou (CN)

(73) Assignee: HAMATON AUTOMOTIVE TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/546,964

(22) PCT Filed: Jun. 21, 2023

(86) PCT No.: PCT/CN2023/101912
§ 371 (c)(1),
(2) Date: Aug. 17, 2023

(87) PCT Pub. No.: WO2024/234442
PCT Pub. Date: Nov. 21, 2024

(65) Prior Publication Data
US 2025/0083480 A1 Mar. 13, 2025

(30) Foreign Application Priority Data

May 16, 2023 (CN) .......................... 202310550082.6
May 16, 2023 (CN) .......................... 202321177227.4

(51) Int. Cl.
*B60C 23/04* (2006.01)
*H01Q 1/22* (2006.01)

(52) U.S. Cl.
CPC ...... *B60C 23/0418* (2013.01); *B60C 23/0479* (2013.01); *H01Q 1/2241* (2013.01)

(58) Field of Classification Search
CPC ............ B60C 23/0418; B60C 23/0479; B60C 23/041; B60C 23/0452; B60C 23/0454;
(Continued)

(56) References Cited

U.S. PATENT DOCUMENTS 5,231,872 A * 8/1993 Bowler ............... B60C 23/0462
73/146.5
6,218,937 B1 * 4/2001 Delaporte ............... B60C 23/20
340/447

(Continued)

FOREIGN PATENT DOCUMENTS

CN 101332749 A 12/2008
CN 101844490 A 9/2010
(Continued)

OTHER PUBLICATIONS

Melexis: "MLX72013 433MHz FSK/ASK Transmitter Datasheet", Jun. 13, 2017 (Jun. 13, 2017), XP093239064, https://www.mouser.com/datasheet/2/734/MLX72013-Datasheet-Melexis-953400.pdf?srsltid=AfmBOoq_RJFbPOBmftTmoiudaNIsz1mJRoO9SXrZO9VpMvIOpfTI79dC (Year: 2017).*

(Continued)

*Primary Examiner* — Eric Blount
(74) *Attorney, Agent, or Firm* — BAKERHOSTETLER (57) ABSTRACT

An external TPMS sensor for heavy-duty trucks comprises a helical antenna and a 1225 cell, and is installed outside a tire of a vehicle; and system power consumption is reduced by increasing the communication rate of the TPMS sensor, and/or decreasing the sampling period, and/or decreasing the number of data frames transmitted every time, and/or
(Continued)

decreasing RF output power, and/or disposing an LNA circuit at an input terminal of a corresponding receiver antenna. The requirement of the TPMS sensor for a long service life is met by reducing system power consumption; the helical antenna, the matching network, and the 5 dBm chip for outputting power are used to realize miniaturization of the TPMS sensor; and the 1225 cell is used, which, compared with traditional TPMS sensors, allows the diameter of the TPMS sensor to be reduced by about 8 mm and the weight of the TPMS sensor to be reduced by over ⅓, such that miniaturization of the TPMS sensor is further realized.

11 Claims, 5 Drawing Sheets

(58) Field of Classification Search
CPC ............ B60C 23/0462; B60C 23/0496; B60C 23/0447; H01Q 1/2241

USPC ........................................................ 340/442
See application file for complete search history.

(56) References Cited

U.S. PATENT DOCUMENTS

| | | | |
|---|---|---|---|
| 11,904,642 B2 * | 2/2024 | Zhang | ................... B60C 29/005 |
| 2016/0016445 A1 * | 1/2016 | Peine | ................... B60C 23/0459 |
| | | | 73/146.5 |

FOREIGN PATENT DOCUMENTS

| | | | | |
|---|---|---|---|---|
| CN | 115782476 A | 3/2023 | | |
| CN | 220114403 U | 12/2023 | | |
| EP | 2465712 A1 * | 6/2012 | ......... | B60C 23/0408 |
| JP | 2006-137226 | 6/2006 | | |

OTHER PUBLICATIONS

International Patent Application No. PCT/CN2023/101912 International Search Report dated Feb. 4, 2024, 4 pages.
European Patent Application No. 23744031.8; Extended European Search Report dated Jan. 30, 2025, 7 pages.
Infineon: "Tire Pressure Monitoring Sensor SP40PLUS Datasheet," May 14, 2020.
Melexis: "MLX72013 433MHz FSK/ASK Transmitter Datasheet," Jun. 13, 2017.

* cited by examiner

EXTERNAL TPMS SENSOR FOR HEAVY-DUTY TRUCKS

CROSS-REFERENCE TO RELATED APPLICATION

The present application is a National Stage of International Application No. PCT/CN2023/101912, filed on Jun. 21, 2023, which claims priority to Chinese Patent Application No. 2023105500826 filed on May 16, 2023, entitled "External TPMS Sensor for Heavy-Duty Trucks", and Chinese Patent Application No. 2023211772274 filed on filed on May 16, 2023, entitled "External TPMS Sensor for Heavy-Duty Trucks", which are hereby incorporated by reference in their entireties.

FIELD

The application relates to the field of tire detection, in particular to an external TPMS sensor for heavy-duty trucks.

BACKGROUND

The tire pressure monitoring system (TPMS) is an auxiliary security system installed on the tires of vehicles to monitor the pressure of the tires in real time. A high-sensitivity tire pressure sensing device with receiving and transmitting functions is installed on each wheel to monitor data, such as pressure and internal temperature, of the tire, in a traveling state or a static state, sends monitoring data to an external controller, and gives an alarm in case of an air leakage or a low air pressure of the tire, such that the traveling safety is guaranteed.

On the premise of guaranteeing system power consumption and timely data updating, existing TPMS sensors for heavy-duty trucks transmit sampled tire temperature data, tire pressure data, battery power data, acceleration data, alarm data and other data to a receiving terminal every 5 s-10 s, the communication rate is generally less than 20 kbps of Manchester encoding, the data transmission capacity is four or more frames in each data packet, and the frames of data in each data packet are identical (that is, as long as the receiving terminal receives one frame of data, the data is valid). A low-rate communication method adopted in the prior art takes a relatively long time to send each frame of data (for example, if a frame of 10-byte data is sent at a rate of 9.6 kbps, it will take 8.3 ms), and is prone to disturbances of other wireless signals in the air, thus increasing the possibility of same-frequency interference and frame conflicts and also increasing the power consumed for transmitting each frame of data; the approach of guaranteeing the transmission stability by improving the number of data frames transmitted every time sacrifices the power of cells and shortens the service life of the cells; and if a large cell is used, the size of the TPMS sensor will be increased. The smallest cells used for the TPMS sensor in the prior art are 1632 cells or larger cells. In design of the TPMS sensor, the size of the cell has a direct influence on the size of the sensor; due to the fact that the sensor works on the tires of vehicles, it is in high-speed rotation state, a large-sized tire pressure sensor will worsen the dynamic unbalance of the tire, and will interfere with the rim when installed, thus reducing the degree of matching between the sensor and the tire. Thus, existing TPMS sensors cannot meet the requirements for a long service life and a small size on the premise of meeting market demands.

In addition, common TPMS sensors for heavy-duty trucks on the present market are internally disposed on an inflating valve or a band, internally attached to the tire, or externally disposed on a tire valve cap. Wherein, every time the internal sensors are installed, the tire has to be disassembled, making the labor cost and time cost high. The sensors externally disposed on the tire valve cap need to be dismantled when the tire is inflated, and be installed after the tire is inflated, and the rubber ring will be aged and deformed due to repeated assembly and disassembly, leading to a high leakage risk; and because the sensors have to be unscrewed every time the tire is inflated, the sealing performance will be reduced, compromising the traveling safety.

SUMMARY

The objective of the application is to meet the requirement of TPMS sensors for a long service life by reducing system power consumption and realize miniaturization of the TPMS sensors by using a helical antenna and a 1225 button cell.

The application is implemented through the following technical solution: an external TPMS sensor for heavy-duty trucks comprises a helical antenna and a 1225 cell, and is installed outside a tire of a vehicle; and system power consumption is reduced by increasing a communication rate of the TPMS sensor, and/or decreasing a sampling period of the TPMS sensor, and/or decreasing the number of data frames transmitted by the TPMS sensor every time, and/or decreasing RF output power of the TPMS sensor, and/or disposing an LNA circuit at an input terminal of a corresponding receiver antenna. In this application, the 1225 cell has a diameter of 12 mm and a thickness of 2.5 mm.

Further, the communication rate of the TPMS sensor is 25 kbps-150 kbps.

Further, the sampling period of the TMPS sensor is 8 s-30 s.

Further, the number of data frames transmitted by the TPMS sensor every time is 1-3.

Further, the number of data frames transmitted by the TPMS sensor every time is 2.

Further, the RF output power of the TPMS sensor is 5 dBm.

Further, the cell is connected in parallel with a supercapacitor C3.

Further, a transmitting terminal of the TPMS sensor is connected to a helical antenna through a matching network, and the matching network comprises a class-E amplifier composed of an inductor L3 and an inductor L1, and an impedance matching network composed of a capacitor C1, a capacitor C2 and an inductor L2.

Further, a diameter of the helical antenna matches a diameter of the 1225 cell, a wire of the helical antenna has a diameter of 0.5 mm and is made of copper, and the number of turns of the wire is 2-5.

In this application, the diameter of the helical wire is a maximum outer diameter of the helical antenna in a circumferential direction.

Further, the communication rate of the TPMS sensor is 25 kbps-150 kbps, the sampling period of the TPMS sensor is 8 s-30 s, the number of data frames transmitted by the TPMS sensor every time is 1-3, and the RF output power of the TPMS sensor is 5 dBm.

The application has the following beneficial effects:
(1) System power consumption is reduced by increasing the communication rate of the TPMS sensor, and decreasing the sampling period, the number of data frames transmitted every time, and/or the RF output power, such that the requirement of the TPMS sensor for a long service life is met.

(2) Due to the fact that the size of the cell determines the size of the sensor, a 1225 cell is used, which, compared with traditional TPMS sensors, allows the diameter of the TPMS sensor to be reduced by about 8 mm and the weight of the TPMS sensor to be reduced by over ⅓, such that miniaturization of the TPMS sensor is effectively realized. The TPMS sensor can be installed easily and will not interfere with the rim; and the sensor is low in weight, and dynamic balance calibration can be omitted.

(3) The communication rate from 25 kbps to 150 kbps is used in the application, it is sufficiently verified that stable data transmission within a distance of 25 m can be realized within this rate range, and the application requirements of heavy-duty trucks for TPMS sensors are met.

(4) In the application, a helical antenna, a matching network and a 5 dBm chip for outputting power are used, and it is proved, by tests and comparison, that the radiation power of the helical antenna is 3-5 dB higher than that of common PIFA loop antennas for TPMS sensors, so the helical antenna is preferred for miniature TPMS sensors.

(5) Optionally, an LNA circuit is additionally disposed at the receiving terminal, such that the sensitivity of the receiving terminal is improved, and the decrease of the sensitivity caused by the increase of the communication rate compensated.

BRIEF DESCRIPTION OF THE DRAWINGS

The drawings are used to provide a further understanding of the application, as one part of the specification, and are used to explain the application together with embodiments of the application, but these drawings are not intended to limit the application. In the drawings.

DETAILED DESCRIPTION OF THE INVENTION

Illustrative embodiments of the disclosure will be described in further detail below with reference to the accompanying drawings. Although the drawings show the illustrative embodiments of the disclosure, it should be understood that the disclosure can be implemented in various other forms and should not be limited by the embodiments expounded here. These embodiments are provided merely to gain a more thorough understanding of the disclosure and completely convey the scope of the disclosure to those skilled in the art.

Figure 1:
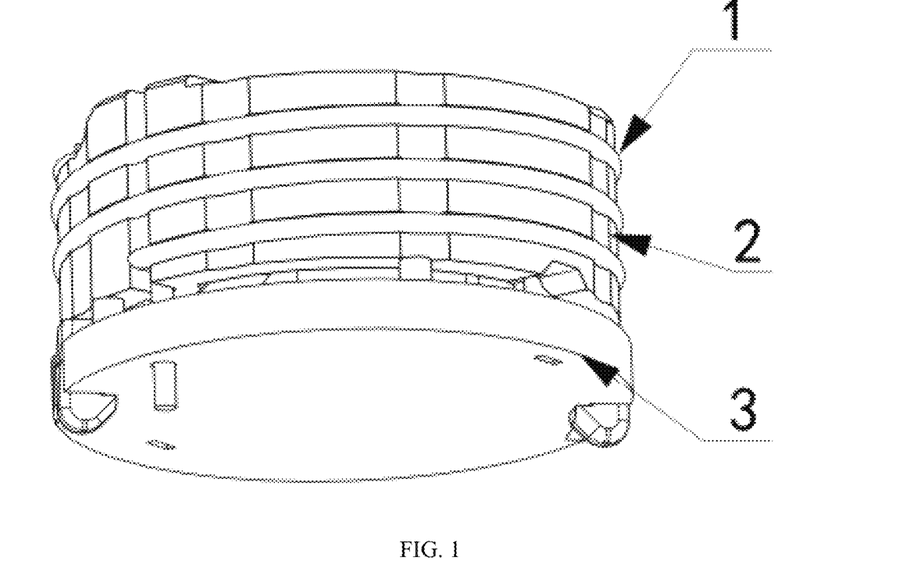
FIG. 1 illustrates the structure of an antenna of a TPMS sensor.

An external TPMS sensor for heavy-duty trucks comprises: a tire pressure detection chip, an antenna stand, a metal wire, a PCB and a cell. As show in FIG. 1, the metal wire 1 is helically wound on the periphery of the antenna stand 2 to form a helical antenna, the PCB 3 is located at the bottom of the antenna stand and is fixedly connected to the antenna stand, and the tire pressure detection chip is integrated on the PCB. The cell is located below the PCB and supplies power to the tire pressure detection chip (not shown). To realize a miniaturization design, the RF radiation efficiency of the sensor can be maximized in a limited space. In this embodiment, the helical antenna is formed by helically inlaying the metal wire in the periphery of the antenna stand, the outer diameter of the helical antenna in the circumferential direction matches the size of the PCB of the sensor, the number of turns of the wire is 2-5, the diameter of the wire is preferably 0.5 mm, and the wire is made of copper; because the diameter of the antenna is less than one wavelength of the dominant frequency 433 MHz, the maximum radiation direction is perpendicular to the axis of the antenna, which provides a higher radiation directionality for the sensor according to the actual installation position of the TPMS sensor; and devices may be disposed in the helical antenna to maximize the space utilization rate.

Figure 2:
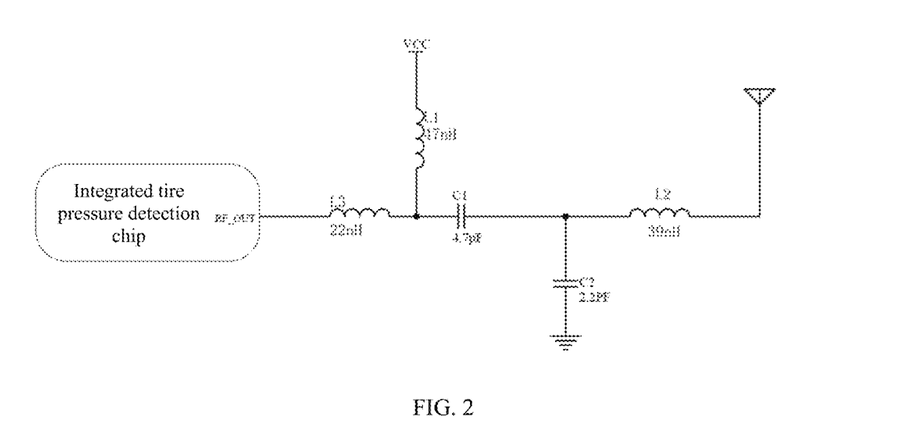
FIG. 2 illustrates a matching network of a helical antenna.

On the premise that other conditions are identical, the radiation power of the helical antenna will be 3-5 dB higher than that of common PIFA loop antennas for TPMS sensors, so the helical antenna is preferred for miniature TPMS sensors. The helical antenna is easy to apply and debug because of its high bandwidth and gain, so matching characteristic impedance of the helical antenna can be realized more easily. The matching network between the tire pressure detection chip and the helical antenna is shown in FIG. 2. Wherein, a transmitting terminal (located on the tire pressure detection chip) of the TPMS sensor is connected to the helical antenna through the matching network, the matching network comprises a class-E amplifier composed of an inductor L3 and an inductor L1, and an impedance matching network composed of a capacitor C1, a capacitor C2 and an inductor L2, and the impedance matching network is used for adjusting the impedance of the antenna Z=50Ω. Defects caused by the decrease of the RF output power are overcome through the helical antenna and the matching network. It should be pointed out that the matching network between the transmitting terminal of the TPMS sensor and the helical antenna is not limited to the circuit structure disclosed in this application, and all matching networks capable of adjusting the impedance of the antenna are applicable.

Embodiment 1

System power consumption is reduced by increasing the communication rate, and decreasing the sampling period, the number of data frames transmitted every time, and the RF output power, such that a smaller cell can be configured for the TPMS sensor.

Figure 3:
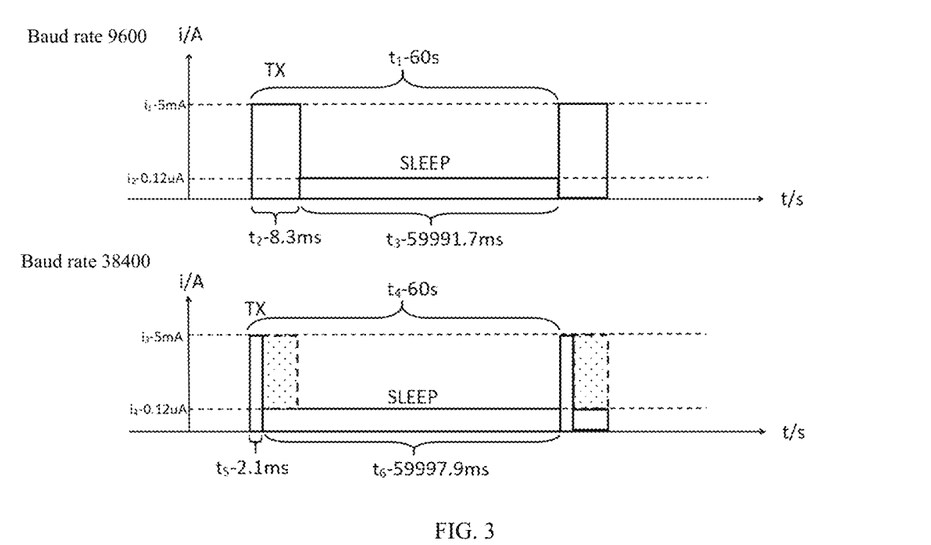
FIG. 3 is a comparison diagram of energy consumed under 9600 bps and in case of 38400 bps.

First, the system power consumption is reduced by increasing the data transmission rate of the TPMS sensor. Specifically, an FSK/ASK/OOK communication rate which is higher than the mainstream communication rate is used, and in this embodiment, the FSK (Frequency-shift keying) communication rate is used. In this embodiment, the operating current of the sensor in the transmitting mode is 5 mA@5 dBm, and in the case where each data frame includes ten bytes, a transmission rate of %00 bps and a transmission rate 38400 bps are used for comparison and verification. Under the transmission rate of 9600 bps, it takes 8.3 ms to send one frame of data, and under the transmission rate of 38400 bps, it takes only 2.1 ms to send one frame of data. Within one transmission period (60 s), the energy saved under the transmission rate of 38400 bps against the transmission rate of 9600 bps is shown by the shaded area in FIG. 3. It can be seen that energy consumed under the transmission rate of 38400 bps is merely ¼ that under the transmission rate of 9600 bpsm, and energy saved within 60 s is W:

$$W = (i_1 * t_2 + i_2 * t_3) - (i_3 * t_5 + i_4 * t_6) =$$
$$(5 \text{ mA} * 8.3 \text{ ms} + 0.12 \text{ uA} * 59991.7 \text{ ms}) -$$
$$(5 \text{ mA} * 2.1 \text{ ms} + 0.12 \text{ uA} * 59997.9 \text{ ms})$$
$$= 8.6 * 10^{-6} \text{ mAh}$$

Energy saved in one year (365 days) is: Wy=W*60*24*365=4.52 mAh.

It can thus be seen that the transmission rate has an obvious influence on power consumption, and compared with low-rate transmission in the prior art, high-rate transmission adopted by the invention greatly reduces the system power consumption.

Second, the system power consumption is reduced by increasing the sampling period. Theoretically, with the increase of the sampling period of the sensor, the time of the sensor in an awake state will become shorter, the time of the system in a dormant state will become longer, and the service life will be prolonged. However, a long sampling period will lead to a delay in system response, data updating and alarming. Therefore, it is of great importance to select a suitable sampling period to balance the demand for the service life of the cell and the requirement for the response speed of the sensor.

The volume of air stored in the tire will be increased with the increase of the size of the tire. Once a leakage occurs, the leakage period will be long. It is actually verified that, with the tire of a 12 R 22.5 truck as an example, when the air pressure in the tire reaches about 8 Bar, the leakage rate is set as 1 cm³/min, and in this case, it takes about 300 s to decrease the air pressure to 7 Bar, indicating that the sampling period of the sensor can be increased without affecting the use of the sensor.

It is verified, by multiple tests, that the sampling period of the TPMS sensor in this embodiment is 8 s to 30 s. Assume the sampling current is 1.4 mA, energy saved under the sampling period of 30 s against the sampling period of 10 s is shown by the shaded area in FIG. 4.

Figure 4:
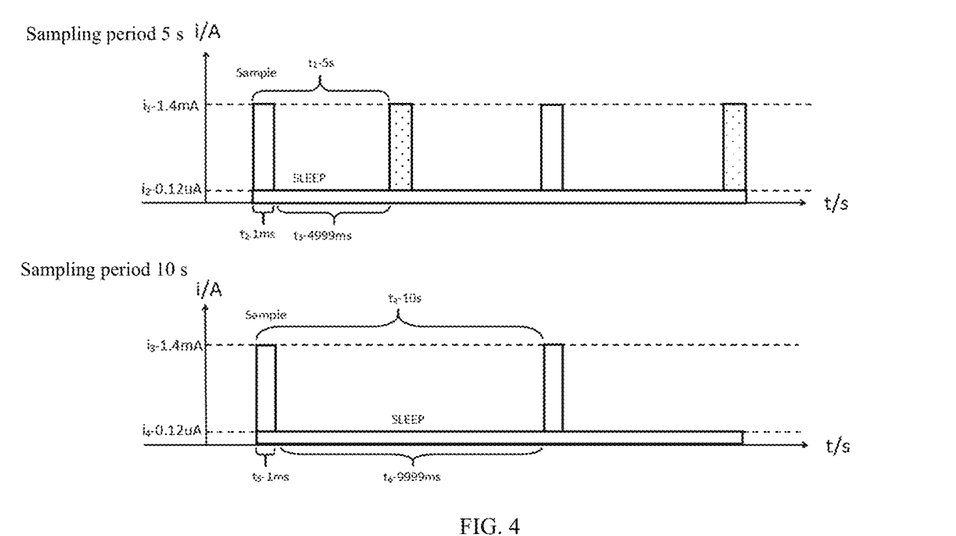
FIG. 4 is a comparison diagram of energy consumed under different sampling periods.

Energy saved in one sampling period (10 s) is $W_1$:

$$W_1 = (i_1 * t_2 * 2 + i_2 * t_3 * 2) - (i_3 * t_5 + i_4 * t_6) =$$
$$(1.4 \text{ mA} * 1 \text{ ms} * 2 + 0.12 \text{ uA} * 4999 \text{ ms} * 2) -$$
$$(1.4 \text{ mA} * 1 \text{ ms} + 0.12 \text{ uA} * 9999 \text{ ms}) = 3.889 * 10^{-7} \text{ mAh}$$

Energy saved in one year (365 days) is $W_{2y}$:

$$W_{2y} = W_1 * 365 * 24 * 60 * 6 = 1.226 \text{ mAh}$$

Figure 5:
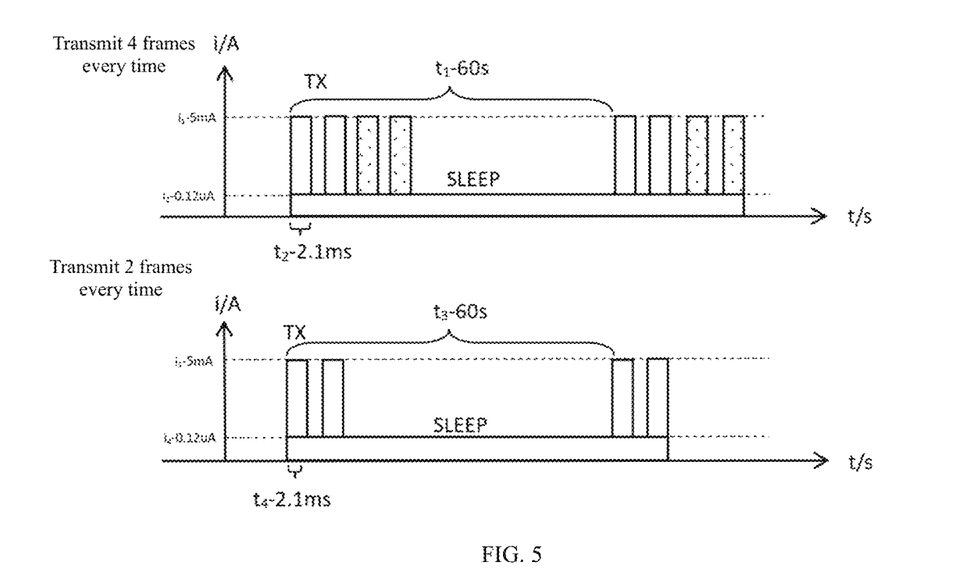
FIG. 5 is a comparison diagram of energy consumed under different numbers of data frames transmitted every time.
Figure 6:
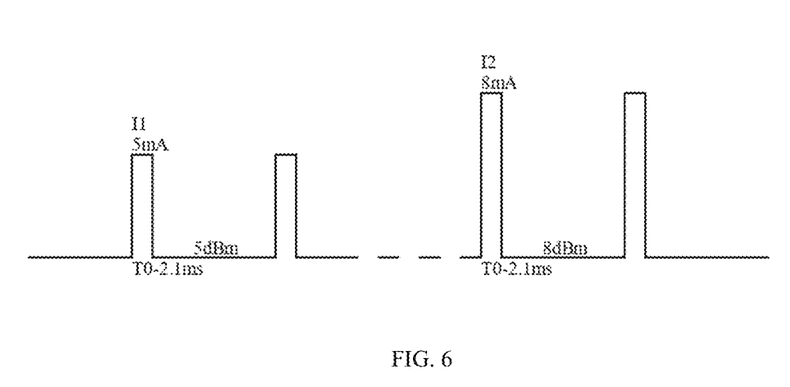
FIG. 6 is a comparison diagram of currents under of different output powers.

Third, the system power consumption is reduced by decreasing the number of data frames transmitted every time. In the prior art, in order to ensure the data transmission stability, a data packet generally includes four or more frames, which has a high requirement for the capacity of the cell. In this embodiment, the number of data frames transmitted every time is decreased to 1-3, and it is recommended that data is transmitted with each data packet including two frames, such that if one frame of data is lost, the other frame can be provided to guarantee the stability of data. This is different from the prior art which uses the excessive design that four or more frames of data are transmitted every time. As shown in FIG. 5, energy saved by the design of transmitting 2 frames of data within 60 s against the design of transmitting 4 frames of data within 60 s is shown by the shaded area in FIG. 5. So, energy saved in one transmitting period ((60 s) is $W_1$:

$$W_1 = (i_1 * t_2 * 4 + i_2 * (t_1 - t_2 * 4)) - (i_3 * t_4 * 2 + i_4 * (t_3 - t_4 * 2)) =$$
$$(5 \text{ mA} * 2.1 \text{ ms} * 4 + 0.12 \text{ uA} * (10 \text{ s} - 2.1 \text{ ms} * 4)) -$$
$$(5 \text{ mA} * 2.1 \text{ ms} * 2 + 0.12 \text{ uA} * (10 \text{ s} - 2.1 \text{ ms} * 2)) = 5.8 * 10^{-6} \text{ mAh}$$

Energy saved in one year is $W_y$:

$$W_y = W_1 * 60 * 24 * 365 = 3.07 \text{ mAh}$$

Fourth, the system power consumption is reduced by decreasing the RF output power. The RF output power of the tire pressure integrated chip of the TPMS sensor is generally 5 dBm or 8 dBm. In this embodiment, because the helical antenna is adopted, a large gain and bandwidth can be obtained under the same size condition, and in order to match the cell, the RF power is set to 5 dBm. Compared with 8 dBm, by adopting 5 dBm, the current at the moment of transmission is smaller, so power is saved, and the voltage drop of the cell caused at the moment of RF transmission can be reduced.

By calculation, energy saved every hour under 5 dBm against 8 dBm is $W_h$:

$$W_h = (I_1 * T_0 * 2.78 * 10^{-7}) - (I_2 * T_0 * 2.78 * 10^{-7}) = 1.75 * 10^{-6} \text{ mAh}$$

Electricity saved in one year (365 days) is $W_y$:

$$W_y = W_h * 365 * 24 * 60 = 0.92 \text{ mAh}$$

By adopting the above methods for reducing transmission power and system sampling power, the TPMS sensor can use a cell with a smaller size and a smaller capacity. It is verified that a CR1225 button cell (a 3.0 V non-rechargeable lithium-manganese dioxide button cell, with a diameter of 12.5 mm, a height of 2.5 mm and a rated capacity of 45-50 mAH) or a BR1225 button cell (a 3.0 V non-rechargeable lithium-perfluorocarbon button cell, with a diameter of 12.5 mm, a height of 2.5 mm and a rated capacity of 45-50 mAH) can meet the operating requirements of the TPMS sensor in this embodiment.

With the 1225 button cell with a capacity C of 48 mAh as an example, the energy utilization rate is set as 70%, the Baud rate is b, the number of bytes transmitted every time is n, the transmitting time under different Baud rates is $t_1$, the dormant time is $t_2$, the transmission period is T (60 s), the transmission current is $i_1$, the dormant current is $i_2$, and two frames of data are transmitted every time, so $$t_1 = \frac{n*8}{b}*2$$

$$t_2 = T - t_1$$

The service life Y (year) is calculated by:

$$Y = \frac{C*70\%}{(i_1*t_1 + i_2*t_2)*60*24*365}$$

The service life of the cell under different Baud rates is shown in Table 2-1 (due to the fact that the service life is calculated in the transmitting mode, without taking into account other detection states, the actual service life of the cell will be lower than the value in the following table). According to the requirement of the TPMS sensors on the market for the service life of the cell (generally, the service life of the cell should be greater than 5 years), the baud rate is set to be over 25 kbps according to Table 1. Therefore, in this embodiment, the baud rate from 25 kbps to 150 kbps is selected as the communication band, and is set by clock frequency division through an internal memory, and the clock frequency is from an external crystal oscillator or an internal RC oscillator. Due to the fact that a higher transmission rate is used, the system can transmit data more rapidly, and the average energy consumption is reduced.

TABLE 1

| Baud rate | Service life (year) |
|---|---|
| 4800 | 1.32 |
| 9600 | 2.54 |
| 19200 | 4.71 |
| 20000 | 4.88 |
| 25000 | 5.87 |
| 38400 | 8.21 |
| 76800 | 13.06 |
| 150000 | 18.36 |

Similarly, as required by the usage scenario, such as a trailer with a smaller wheelbase, the baud rate can be higher. A higher baud rate is more beneficial to power saving, but it will correspondingly exert an influence on the RF transmission distance, which depends on the actual use environment. For example, a higher baud rate can be used on an occasion requiring a short RF transmission distance and a long service life of the cell.

Compared with traditional TPMS sensors, by adopting the 1225 button cell, the diameter of the TPMS sensor can be reduced by about 8 mm, the weight of the TPMS sensor can be reduced by over ⅓, and miniaturization of the sensor is realized truly.

Figure 7:
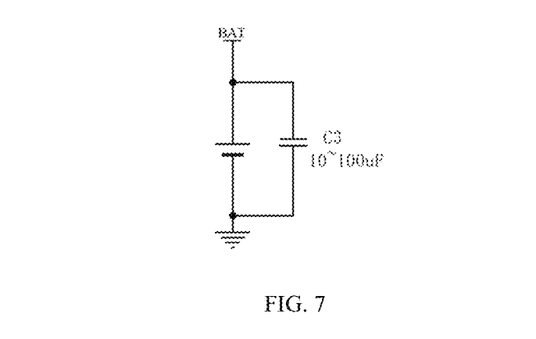
FIG. 7 is a schematic diagram of a super-capacitor C connected in parallel with two terminals of a cell.

Further, to solve the problem of a small capacity and a small output current of the 1225 button cell, a super-capacitor is disposed the circuit for storage, and a voltage drop of the sensor generated at the moment of transmission can be counteracted based on the charging-discharging principle of the capacitor, as shown in FIG. 7. In this embodiment, a super-capacitor C3 is connected in parallel between the positive pole and the negative pole of the cell, a 22 uF-100 uF super-capacitor is recommended, a multiplayer ceramic chip capacitor (MLCC) is preferred, and the MLCC has a low ESR and leakage current and can reduce the voltage drop generated at the transmission moment of the system.

Figure 8:
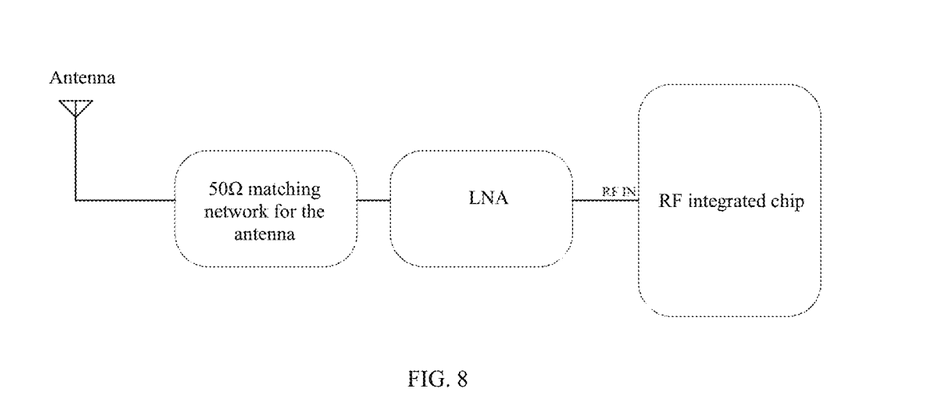
FIG. 8 is a principle reference block diagram of an LNA disposed at a receiving terminal.

Moreover, in this embodiment, due to the fact that the data transmission rate of the TPMS sensor is increased, the bandwidth for data transmission is increased, which reduces the sensitivity of the receiving terminal to some extend; in addition, due to the fact that the RF output power of the sensor is decreased to 5 dBm, a great challenge is posed to the RF transmission distance. To overcome these adverse factors, it is far from enough merely to optimize the antenna of the sensor into a helical antenna, and in order to guarantee the communication stability, a low noise amplifier (LNA) is preferably disposed at an input terminal of a corresponding receiver antenna of the TPMS sensor, the LNA may be adopt an integrated chip scheme or a separated transistor scheme; in the transistor scheme, a common-emitter class-E amplifier the collector current less than 6 mA is recommended; the LNA with an integrated LNA chip is abundant. The difference between these two types of LNAs is as follows: the transistor LNA is low in price, the gain can be adjusted freely as actually needed, but the noise factor is large; the integrated LNA chip has a low noise factor, which is more beneficial to the signal to noise ratio, but the price is high. The principle reference block diagram is shown in FIG. 8.

Figure 9:
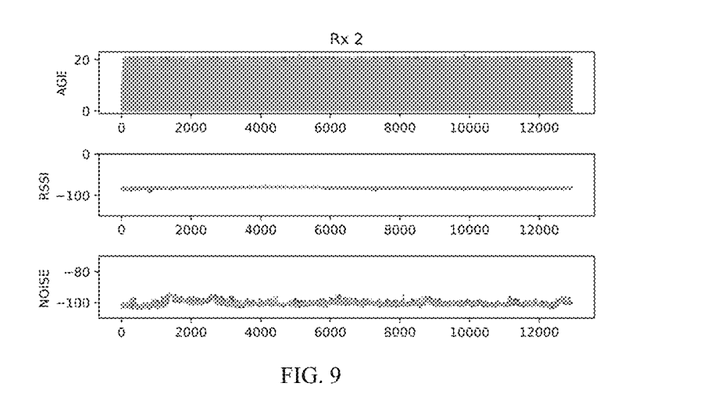
FIG. 9 illustrates a test result of the receiving rate in case where the distance between a TPMS sensor and a receiver is 40 m according to the first embodiment.

An antenna signal enters the 50 Ωmatching network, and the antenna is converted by the network into equivalent 50Ω, such that the loss of the input signal is minimized when the input signal is transmitted to the next stage. In this embodiment, the LNA is preferably added to amplify the signal of the input terminal of the antenna to reduce the return loss. It is recommended that the gain of the amplifier is 10-20 db and the noise factor of the amplifier is less than 3.5. The LNA circuit is added to improve the sensitivity of the receiving terminal to compensate for the decease of the sensitivity caused by the increase of the baud rate. The signal is tested with 50Ω, and it is proved, by comparison, that, by adding the LNA, the effective sensitivity of the receiving terminal is improved by about 4-6 dBm, and the total signal radiation is improved by 7-11 dB through the helical antenna adopted by the sensor; and the sensor can adapt to a higher baud rate of the system through the transmitting terminal and the receiving terminal. FIG. 9 shows a test result obtained in case where the distance between the sensor and the receiver is 40 m. The altitude of the receiver and the sensor is 1 m, the communication rate is 76.8 kbps, the AGE of the sensor is that data is transmitted every 20 s, and after being continuously tested for about 4 h, the receiving rate of the sensor is 100%, indicating that the sensor in this embodiment has good RF performance after being improved through many methods.

The TPMS sensor in the application can realize normal communication within a high-rate band (25 kbps-150 kbps) in the FSK communication mode, and the communication distance may reach 22 m or over through the hardware-specified circuit design and the external structural design. According to actual tests, for a three-axle truck, the baud rate is 76.8 kbps, the receiver is installed at the center of the bottom of the truck, and the receiving rate may reach about 95%: if the baud rate is adjusted to 38.4 kbps, the receiving rate may reach 98%; when the receiver is installed close to a rear suspension of the three-axle truck, the receiver is closer to the tire, and it is proved, by tests, that the receiving rate may reach about 90% when the baud rate is 150 kbps, which also meets actual receiving requirements.

Embodiment 2

The system power consumption is reduced by increasing the data transmission rate of the TPMS sensor to 25 kbps-150 kbps, and a 1225 button cell is used. The TPMS sensor adopts a helical antenna, or an LNA circuit is additionally arranged at an input terminal of a corresponding receiver antenna.

In this embodiment, the FSK communication rate which is higher than the mainstream communication rate on the market is used. To calculate the power saving effect realized by increasing the baud rate, the operating current of the sensor in the transmitting mode is 5 mA@5 dBm. and in case where each data frame comprises 10 bytes, the transmission rate of 9600 bps and the transmission rate of 38400 bps are used for comparison and verification. It takes 8.3 ms to send one frame of data under the transmission rate of 9600 bps, and it takes 2.1 s to send one frame of data under the transmission rate of 38400 bps. Energy saved under the transmission rate of 38400 bps against the transmission rate of 9600 bps is shown by the shaded area in FIG. 3. It can be seen that power consumed under the transmission rate of 38400 bps is merely ¼ that under the transmission rate of 9600 bps. Power saved within 60 s is W:

$$W = (i_1 * t_2 + i_2 * t_3) - (i_3 * t_5 + i_4 * t_6) =$$
$$(5 \text{ mA} * 8.3 \text{ ms} + 0.12 \text{ uA} * 59991.7 \text{ ms}) -$$
$$(5 \text{ mA} * 2.1 \text{ ms} + 0.12 \text{ uA} * 59997.9 \text{ ms})$$
$$= 8.6 * 10^{-6} \text{ mAh}$$

Energy saved in one year (365 days) is: $W_y = W*60*24*365 = 4.52$ mAh.

It can thus be seen that the transmission rate has an obvious influence on power consumption, and compared with low-rate transmission in the prior art, high-rate transmission adopted by the invention greatly reduces system power consumption.

The TPMS sensor in the application can realize normal communication within a high-rate band (25 kbps-150 kbps) in the FSK communication mode, and the communication distance may reach 22 m or over through the hardware-specified circuit design and the external structural design. The specific value of the baud rate can be adjusted between 25 kbps and 150 kbps according to the distance between the TPMS sensor and a receiver on the tire of a truck and the receiving rate.

Embodiment 3

The system power consumption is reduced by increasing the number of data frames transmitted every time, and a 1225 button cell is used. The TPMS sensor adopts a helical antenna, or an LNA circuit is additionally arranged at an input terminal of a corresponding receiver antenna.

In the prior art, in order to ensure the data transmission stability, a data packet generally includes four or more frames, which has a high requirement for the capacity of the cell. In this embodiment, the number of data frames transmitted every time is decreased to 1-3, and it is recommended that data is transmitted with each data packet including two frames, such that if one frame of data is lost, the other frame can be provided to guarantee the stability of data. This is different from the prior art which uses the excessive design that four or more frames of data are transmitted every time. As shown in FIG. 5, energy saved by the design of transmitting 2 frames of data within 60 s against the design of transmitting 4 frames of data within 60 s is shown by the shaded area in FIG. 5. So, energy saved in one transmitting period (60 s) is $W_1$:

$$W_1 = (i_1 * t_2 * 4 + i_2 * (t_1 - t_2 * 4)) - (i_3 * t_4 * 2 + i_4 * (t_3 - t_4 * 2)) =$$
$$(5 \text{ mA} * 2.1 \text{ ms} * 4 + 0.12 \text{ uA} * (10 \text{ s} - 2.1 \text{ ms} * 4)) -$$
$$(5 \text{ mA} * 2.1 \text{ ms} * 2 + 0.12 \text{ uA} * (10 \text{ s} - 2.1 \text{ ms} * 2)) = 5.8 * 10^{-6} \text{ mAh}$$

Energy saved in one year is $W_y$:

$$W_y = W_1 * 60 * 24 * 365 = 3.07 \text{ mAh}$$

Embodiment 4

Figure 10:
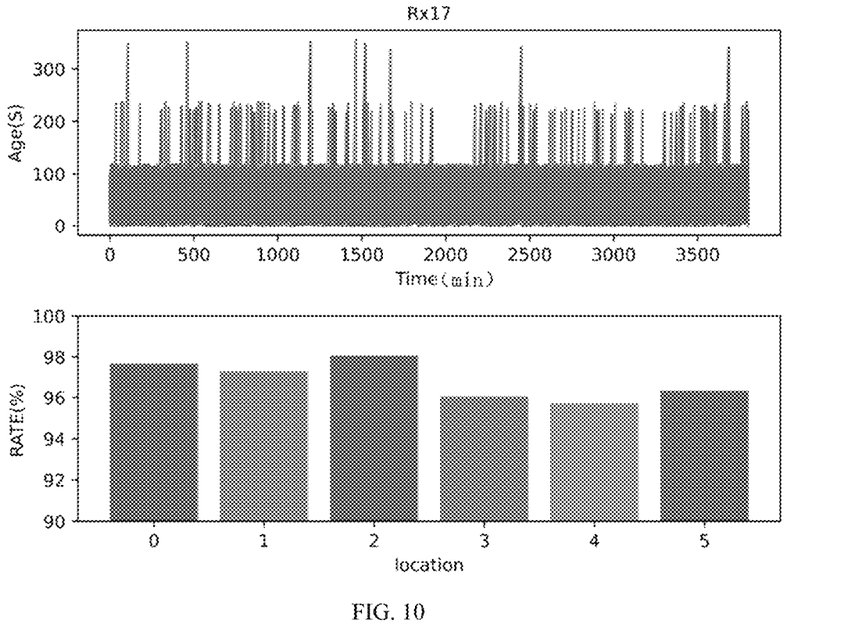
FIG. 10 illustrates a test result of the receiving rate in case where the distance between the TPMS sensor and the receiver is 3.5 m according to the fourth embodiment.

In actual use, trucks are of different specifications such as large-sized trucks, and small and medium-sized trucks. For small-sized trucks such as two-axle trucks with a wheelbase of about 4.5 m, the LNA may not be added; when the receiver is located at the bottom of the truck, the maximum distance between the receiver and the sensor on the tire will not be over 3.5 m; and according to actual measurement, when the TPMS sensor is applied to these small-sized trucks, in order to reduce costs and design difficulties, the LNA circuit may not be added to the receiver, and in this case, normal communication can still be realized. In this embodiment, six sensors are mounted on six tires of a small-sized truck, the distance between the sensor and the receiver is 3.5 m, the communication rate is 76.8 kbps, the AGE of the sensor is that data is transmitted every 120 s, and after being tested for about 4000 minutes, the continuous receiving rate is over 95%, as shown in FIG. 10, satisfying use requirements.

Embodiment 5

Figure 11:
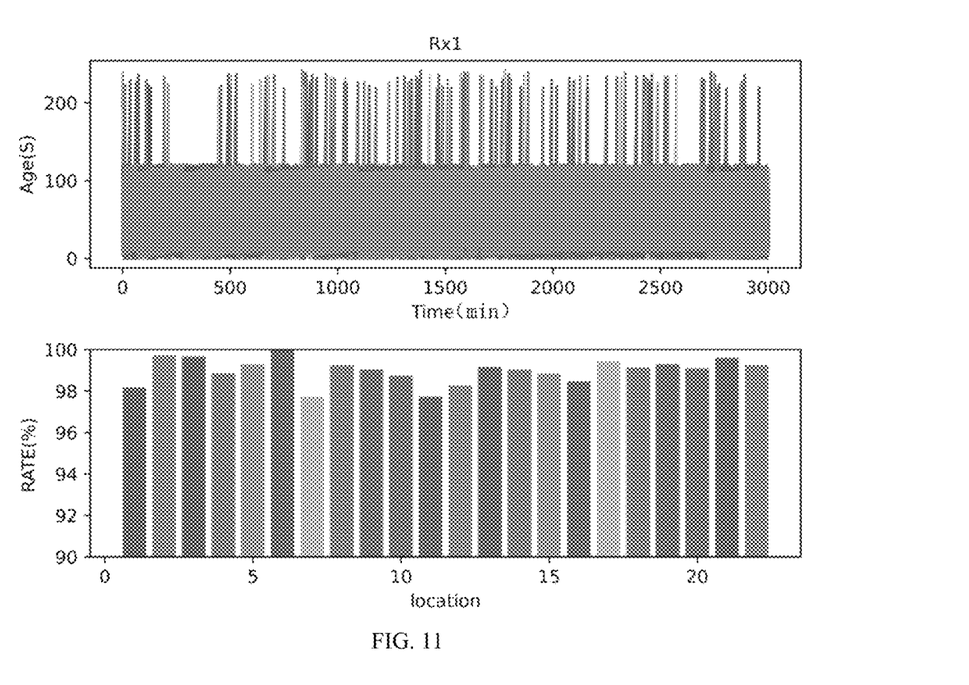
FIG. 11 illustrates a test result of the receiving rate in case where the distance between the TPMS sensor and the receiver is 10 m according to the fifth embodiment.

For large-sized trucks such as tow trucks, trailers and other six-axle trucks, with a total length being over 18 m and a wheelbase between front tires and rear wheels being over 15 m, when the receiver is mounted in the middle of the truck, the maximum distance between the receiver and the tires is about 10 m, and the hubs have a shielding effect, so the requirement for RF signals in this application environment is extremely high. In this case, a solution provided by the invention is to add an LNA to the receiver to improve the receiving sensitivity to adapt to a longer distance between the receiver and the sensor. In an actual test, the LNA is added to the receiver, the communication rate is 38.4 kbps, as shown in FIG. 11, 22 sensors are correspondingly disposed on 22 tires, the length of the truck is about 21 m, the distance between the sensor and the receiver is about 10 m, the AGE of the sensor is that data is transmitted every 120 s, and after being tested four about 3000 minutes, the truck runs, and it is tested that the receiving rate can each 95%, satisfying usage requirements.

What is claimed is:

1. An external tire pressure monitoring system (TPMS) sensor for heavy-duty trucks, wherein the external TPMS sensor comprises a helical antenna and a 1225 cell, and is installed outside a tire of a vehicle; and system power consumption is reduced by decreasing a sampling period of the external TPMS sensor, and/or decreasing a number of data frames transmitted by external the TPMS sensor every time and/or disposing a low noise amplifier (LNA) circuit at an input terminal of a corresponding receiver antenna.

2. The external TPMS sensor for heavy-duty trucks of claim 1, wherein a communication rate of the external TPMS sensor is 25 kbps-150 kbps.

3. The external TPMS sensor for heavy-duty trucks of claim 1, wherein the sampling period of the external TMPS sensor is 8 s-30 s.

4. The external TPMS sensor for heavy-duty trucks of claim 3, wherein the number of data frames transmitted by the external TPMS sensor every time is 1-3.

5. The external TPMS sensor for heavy-duty trucks of claim 4, wherein the number of data frames transmitted by the external TPMS sensor every time is 2.

6. The external TPMS sensor for heavy-duty trucks of claim 1, wherein RF output power of the external TPMS sensor is 5 dBm.

7. The external TPMS sensor for heavy-duty trucks of claim 1, wherein the 1225 cell is connected in parallel with a super-capacitor C3.

8. The external TPMS sensor for heavy-duty trucks of claim 1, wherein a transmitting terminal of the external TPMS sensor is connected to a helical antenna through a matching network, and the matching network comprises a class-E amplifier composed of an inductor L3 and an inductor L1, and an impedance matching network composed of a capacitor C1, a capacitor C2 and an inductor L2.

9. The external TPMS sensor for heavy-duty trucks of claim 1, wherein a diameter of the helical antenna matches a diameter of the 1225 cell, a wire of the helical antenna has a diameter of 0.5 mm and is made of copper, and a number of turns of the wire is 2-5.

10. The external TPMS sensor for heavy-duty trucks of claim 1, wherein the communication rate of the external TPMS sensor is 25 kbps-150 kbps, the sampling period of the external TPMS sensor is 8 s-30 s, the number of data frames transmitted by the external TPMS sensor every time is 1-3, and RF output power of the external TPMS sensor is 5 dBm.

11. The external TPMS sensor for heavy-duty trucks of claim 2, wherein the sampling period of the external TMPS sensor is 8 s-30 s.

* * * * *